(12) United States Patent
Vitanov et al.

(10) Patent No.: US 8,340,652 B2
(45) Date of Patent: *Dec. 25, 2012

(54) SYSTEM AND METHOD OF WASTE MANAGEMENT

(75) Inventors: Kamen Vitanov, Mississauga (CA); Laura Doktorova, Mississauga (CA); Michael Shenfield, Richmond Hill (CA); Viera Bibr, Kilbride (CA); Richard Qing, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 440 days.

This patent is subject to a terminal disclaimer.

(21) Appl. No.: 12/783,802

(22) Filed: May 20, 2010

(65) Prior Publication Data

US 2010/0235600 A1    Sep. 16, 2010

Related U.S. Application Data

(63) Continuation of application No. 11/405,598, filed on Apr. 18, 2006, now Pat. No. 7,738,866.

(60) Provisional application No. 60/672,055, filed on Apr. 18, 2005.

(51) Int. Cl.
    *H04M 3/00*    (2006.01)

(52) U.S. Cl. ..... 455/419; 455/418; 455/420; 455/550.1; 455/412.1; 711/166; 711/170

(58) Field of Classification Search .......... 455/418–420, 455/550.1; 711/166, 170
See application file for complete search history.

(56) References Cited

U.S. PATENT DOCUMENTS

| | | | |
|---|---|---|---|
| 7,240,104 B2 * | 7/2007 | Gautney | 709/221 |
| 7,379,731 B2 * | 5/2008 | Natsuno et al. | 455/412.1 |
| 7,660,581 B2 * | 2/2010 | Ramer et al. | 455/432.3 |
| 7,738,866 B2 * | 6/2010 | Vitanov et al. | 455/433 |
| 2002/0120741 A1 * | 8/2002 | Webb et al. | 709/225 |
| 2005/0227683 A1 * | 10/2005 | Draluk et al. | 455/419 |

* cited by examiner

*Primary Examiner* — Sharad Rampuria
(74) *Attorney, Agent, or Firm* — Gowling Lafleur Henderson LLP

(57) ABSTRACT

A method of application waste management in a wireless device is provided. The method comprised a first low-memory event. Deleting a first set of data records incrementally until event is cleared or no more records are present. Determining a second low-memory event when memory is still low. Executing a clean-up script to mark additional data records for deletion. Deleting the second set of data records until the second low-memory condition are cleared or no more records are present.

18 Claims, 10 Drawing Sheets

US 8,340,652 B2

SYSTEM AND METHOD OF WASTE MANAGEMENT

CROSS-REFERENCE TO RELATED APPLICATION

This application is a continuation of application Ser. No. 11/405,598, filed on Apr. 18, 2006, the entire disclosure of which is hereby incorporated by reference for all purposes.

The non-provisional application claims the benefit of U.S. Provisional Application No. 60/672,055 filed Apr. 18, 2005, which is hereby incorporated by reference.

TECHNICAL FIELD

The present patent disclosure relates generally to a communications system for providing communications to a plurality of devices and specifically to a system and method of waste management.

BACKGROUND

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

Due to the proliferation of wireless networks, there are a continually increasing number of wireless devices in use today. These devices include mobile telephones, personal digital assistants (PDAs) with wireless communication capabilities, two-way pagers and the like. Concurrently with the increase of available wireless devices, software applications running on such devices have increased their utility. For example, the wireless device may include an application that retrieves a weather report for a list of desired cities or an application that allows a user to shop for groceries. These software applications take advantage of the ability to transmit data of the wireless network in order to provide timely and useful services to users, often in addition to voice communication. However, due to a plethora of different types of devices, restricted resources of some devices, and complexity of delivering large amounts of data to the devices, developing software applications remains a difficult and time-consuming task.

A wireless handheld device has limited battery power, memory and processing capacity. Since communication on a device is very expensive in terms of energy consumption, it is desirable to minimize message traffic to and from the device as much as possible.

Currently, wireless applications either use waste notification, or do not provide waste management. An application that supports waste notification simply issues a visual notification (e.g., a dialog window) to a user, who then has to decide to shut down the application and manually free up some space for the application, or choose to continue using the application yet without the permission to save data to the storage system. An example of such an application is a word processing application.

BRIEF DESCRIPTION OF THE DRAWINGS

An embodiment of the patent disclosure will now be described by way of example only with reference to the following drawings in which.

DETAILED DESCRIPTION

Figure 1:
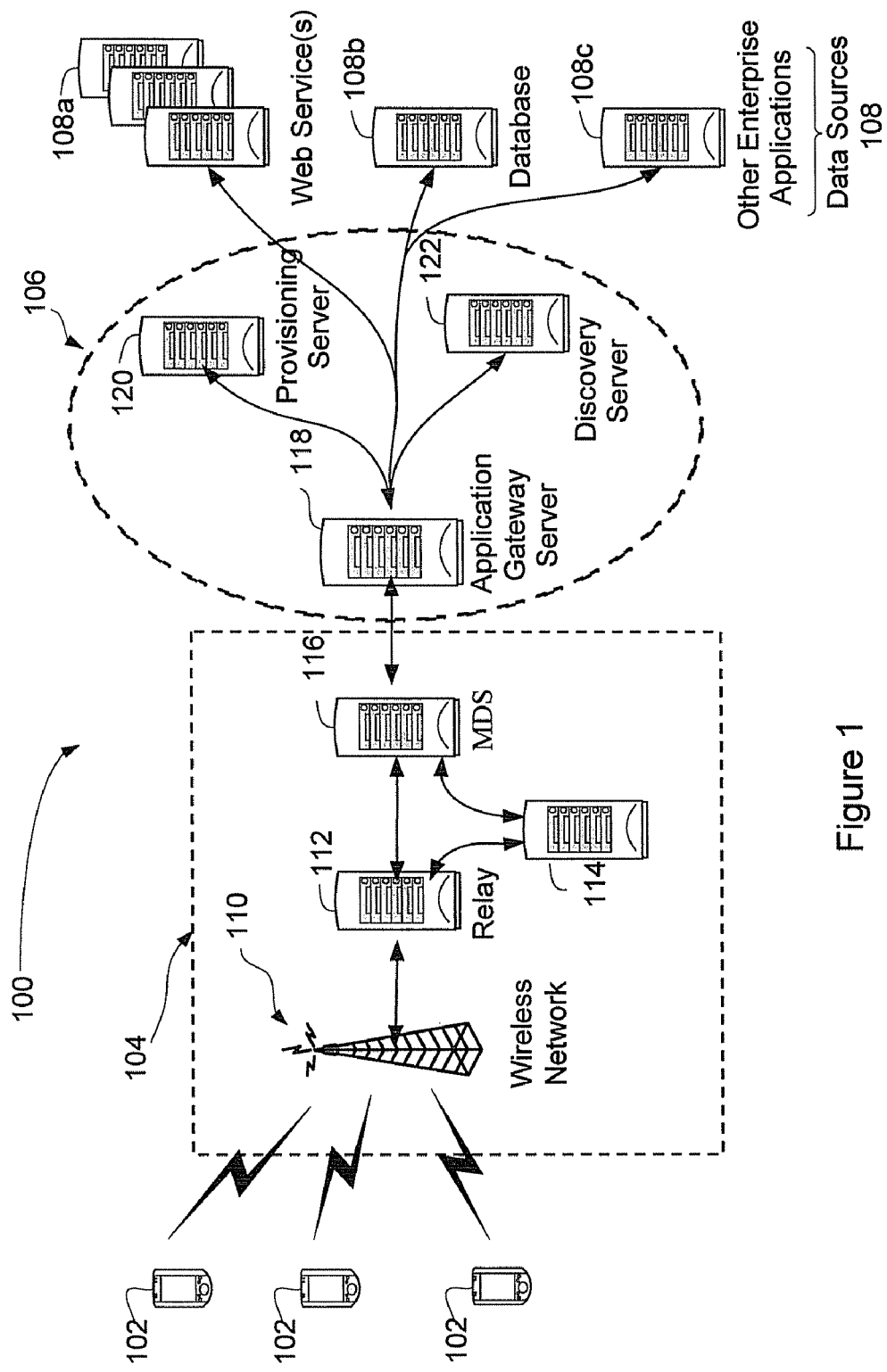
FIG. 1 shows in a schematic diagram an example of a network facilitating wireless component applications.

In accordance with an embodiment of the present patent disclosure, there is provided a method of memory management on a wireless device, the method comprising: determining a first low-memory event when available memory is below a defined threshold; deleting a first set data records stored in the memory when the first low-memory event is determined, the first set of data records incrementally deleted in order of a priority associated with each data record until the first low-memory condition is cleared or no more of the first set of data records are present; determining a second low-memory event when available memory is still below a defined threshold after deletion of the first set of data records; executing a cleanup script on the wireless device, the cleanup scripts marking a second set of data records for deletion and assigning a priority when the second low-memory event occurs; and deleting the second set data records stored in memory when the second low-memory event is determined, the second set of data records incrementally deleted based in order of priority associated with each data record until the second low-memory condition is cleared or no more of the second set of data records are present.

In accordance with another embodiment of the present patent disclosure, there is provided a wireless device comprising: a memory comprising a plurality of data records, each of the data records associated with one or more applications executed on the device; a processor coupled to the memory, the processor performing: determining a first low-memory event when available memory is below a defined threshold; deleting a first set data records stored in the memory when the first low-memory event is determined, the first set of data records incrementally deleted in order of a priority associated with each data record until the first low-memory condition is cleared or no more of the first set of data records are present; determining a second low-memory event when available memory is still below a defined threshold after deletion of the first set of data records; executing a cleanup script on the wireless device, the cleanup scripts marking a second set of data records for deletion and assigning a priority when the second low-memory event occurs; and deleting the second set data records stored in memory when the second low-memory event is determined, the second set of data records incrementally deleted based in order of priority associated with each data record until the second low-memory condition is cleared or no more of the second set of data records are present.

The patent disclosure provides a waste management system for wireless applications. An application is allowed to register its waste, i.e., application data or data records that could be deleted, to the waste management system. Each data record registered as waste is associated with a deletion priority. The waste management system then removes registered waste based on the priority that is associated.

Advantageously, the waste management system and method allows for efficient and dynamic handling of application waste during low-memory situations.

A system and method of the present patent disclosure will now be described with reference to various examples of how the embodiments can best be made and used. For convenience, like reference numerals are used throughout the description and several views of the drawings to indicate like or corresponding parts, wherein the various elements are not necessarily drawn to scale.

Referring to FIG. 1, an example of a communication infrastructure is illustrated generally by numeral 100. The communication infrastructure 100 comprises a plurality of wireless devices 102, a communication network 104, an application gateway 106, and a plurality of backend services 108.

The wireless devices 102 are typical personal digital assistants (PDAs), but may include other devices. Each of the wireless devices 102 includes a runtime environment capable of hosting a plurality of component applications.

Component applications comprise one or more data components, presentation components, and/or message components, which are written in a structured definition language such as Extensible Markup Language (XML) code. The component applications can further comprise workflow components which contain a series of instructions such as written in a subset of ECMAScript, and can be embedded in the XML code in some implementations. Therefore, since the applications are compartmentalized, a common application can be written for multiple devices by providing corresponding presentation components without having to rewrite the other components. Further, large portions of the responsibility of typical applications are transferred to the runtime environment for component application. Details of the component applications are further described below.

The wireless devices 102 are in communication with the application gateway 106 via the communication network 104. Accordingly, the communication network 104 may include several components such as a wireless network 110, a relay 112, a corporate server 114 and/or a mobile data server (MDS) 116 for relaying data between the wireless devices 102 and the application gateway 106.

The application gateway 106 comprises a gateway server 118 a provisioning server 120 and a discovery server 122. The gateway server 118 acts as a message broker between the runtime environment on the wireless devices 102 and the backend servers 108. The gateway server 118 is in communication with both the provisioning server 120 and the discovery server 122. The gateway server 110 is further in communication with a plurality of the backend servers 108, such as Web services 108a, database services 108b, as well as other enterprise services 108c, via a suitable link. For example, the gateway server 118 is connected with the Web services 108a and database services 108b via Simple Object Access Protocol (SOAP) and Java Database Connectivity (JDBC) respectively. Other types of backend servers 108 and their corresponding links can be connected to the gateway server 118.

Preferably, each wireless device 102 is initially provisioned with a service book or IT policy facility to establish various protocols and settings, including connectivity information for the corporate server 114 and/or the mobile data server 116. These parameters may include a uniform resource locator (URL) for the application gateway server 118 as well as its encryption key. Alternatively, if the wireless device 102 is not initially provisioned with the URL and encryption key, they may be pushed to the wireless device 102 via the mobile data server 116. The mobile device 102 can then connect with the application gateway 106 via the URL of the application gateway server 118.

Figure 2:
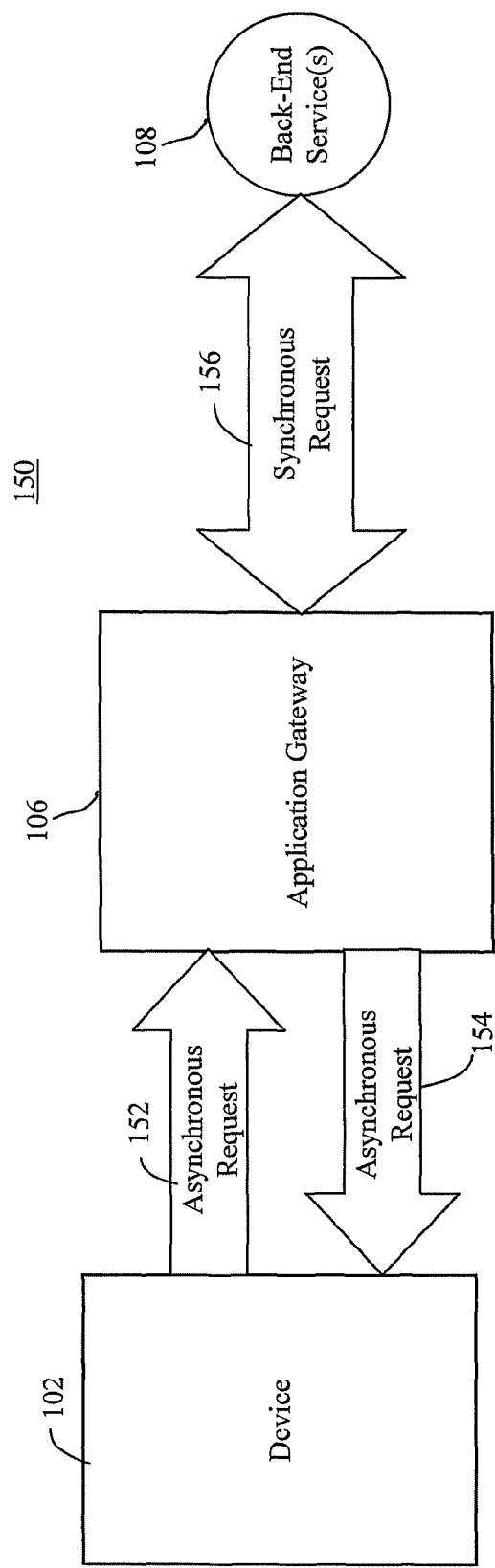
FIG. 2 shows in a flow diagram an example of a wireless component application communication model.

Referring to FIG. 2 there is illustrated in a flow diagram an example of a wireless component application communication model 150. From a high-level perspective, the overall wireless component application infrastructure 150 includes a wireless component application runtime environment (device RE) running on the device 102 and a wireless component application gateway (AG) 106 running on the server 118.

The AG 106 serves as a mediator between a wireless component application (sometimes referred to as application in this disclosure) executed by the RE and one or more back-end services 108 with which the application communicates. Often the back-end service is expected to be a Web service 108a using SOAP over HTTP or HTTPS as the transport protocol. As Web services are the most commonly expected back-end service 108, the term. Web service is used interchangeable with back-end service 108 throughout this disclosure. However, it is appreciated that other types of back-end services can also be adapted to the disclosure. FIG. 2 exemplifies a synchronous link with a back-end service 108. However, it should be appreciated that the AG 106 can be in communication with back-end services 108 over asynchronous links.

The wireless component application communication model 150 is based upon asynchronous messaging paradigm. In this model the application gateway (AG) 106 establishes and mediates the connection between the device 102 and the back-end service(s) 108 to:

1. Achieve greater flexibility in resource management.
2. Provide reliable communication link between device 102 and back-end service 108 to handle situations when wireless coverage is unstable.
3. Efficiently distribute workload between device RE 102 and AG 106.

Figure 3:
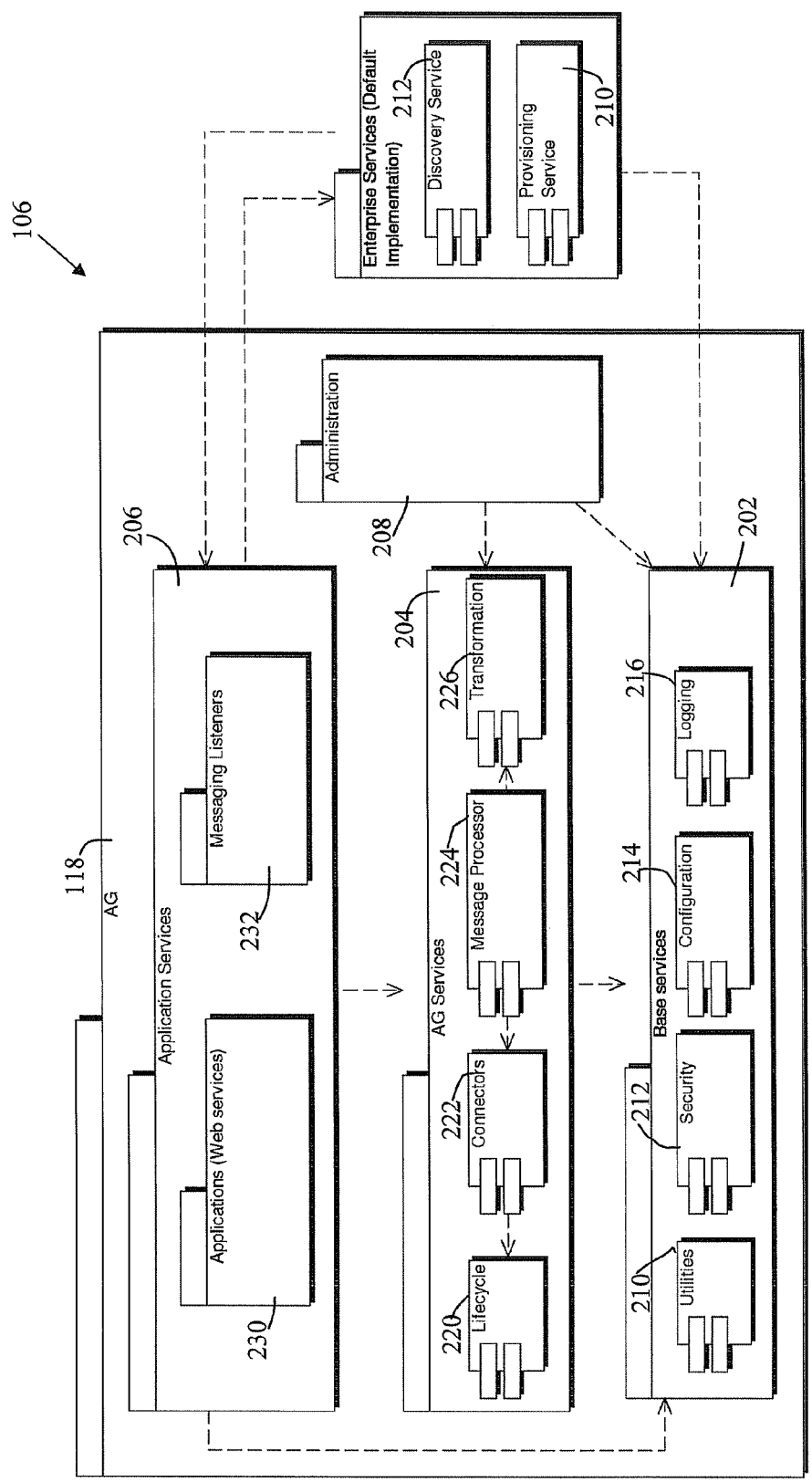
FIG. 3 shows in a detailed component diagram an example of the application gateway shown in FIG. 1.

Referring to FIG. 3, a more detailed view of an example of the application gateway 106 is shown. The application gateway server 118 includes three layers of service; a base services layer 202, an application gateway services layer 204 and an application services layer 206. The application gateway server 118 further includes an administration service 208.

A provisioning service 210 and a discovery service 212 are provided by the provisioning server 120 and discovery server 120, respectively.

At the lowest level, the base services layer 202 offers basic, domain-independent system services to other components in higher levels. Thus, for example, all subsystems in the application gateway services layer 204 and the application services layer 206 can utilize and collaborate with the subsystems in the base services layer 202. In the present embodiment, the base services layer 202 includes a utilities subsystem 210, a security subsystem 212, a configuration subsystem 214, and a logging subsystem 216.

The application gateway services layer 204 provides wireless component application domain-specific services. These services provide efficient message transformation and delivery to backend systems 108 and provide wireless device 102 and component application lifecycle management. In the present embodiment, the application gateway services layer 204 includes a lifecycle subsystem 220, a connector subsystem 222, a messaging subsystem 224, and a transformation subsystem 226.

The application services layer 206 sits at the top of the architecture and provides external program interfaces and user interfaces using subsystems provided by the lower layers. For example, various applications such as a service provider lifecycle application, a packaging application and a message listening application provide external program interfaces since they communicate primarily with applications on external systems. Similarly, an administration application provides a user interface by providing a user with the ability to access and potentially modify application gateway data and/or parameters.

The administration service 208 is responsible for administrative system messages, administration of the wireless devices 102, runtime administration of the application gateway subsystems, support and display system diagnostics, and administration of default implementations of the provisioning and discovery services.

The messaging listening application (or messaging listeners 232) provides an interface for receiving messages from the wireless devices 102 as well as external sources and forwarding them to the messaging subsystem. Further, the message listening application 232 typically authenticates that the source of the message is valid.

Figure 4:
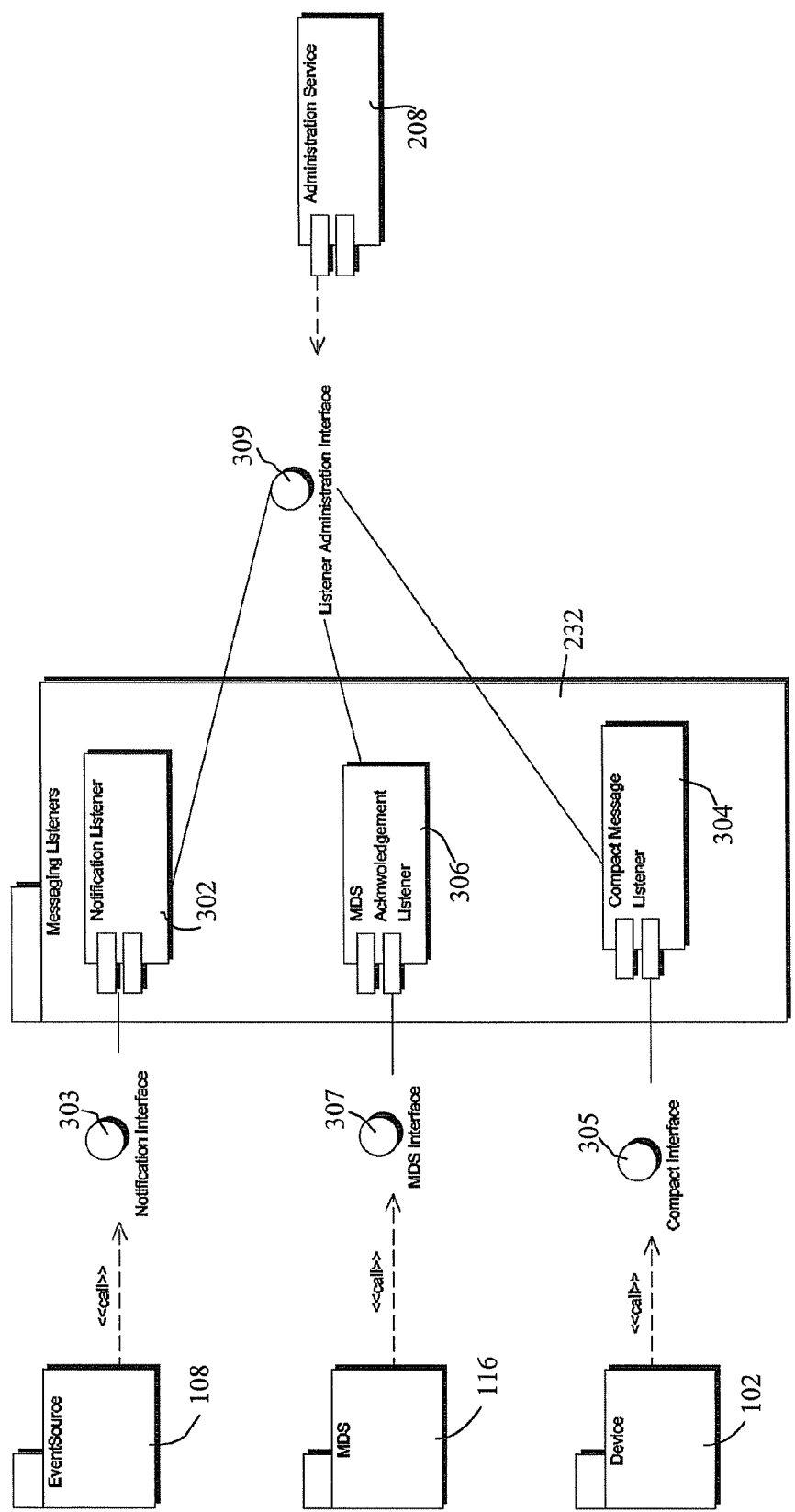
FIG. 4 shows in an interface diagram an example of a security subsystem.

Referring to FIG. 4, an example of the message listening application 232 is shown in greater detail. The message listening application 232 includes three listeners: a notification listener 302, a compact message listener 304, and a mobile data service acknowledgement listener 306. The notification listener 302 receives notification and response messages from event sources 108c via a notification interface 303. Other message listener interfaces may be added.

In one embodiment, the notification interface 303 may be implemented using Web Service (WS) Eventing. Web services often want to receive messages when events occur in other services, such as the event sources, and applications. A mechanism for registering interest is provided in the art by WS Subscription. WS Subscription defines a protocol for one Web service, referred to as a subscriber, to register interest with another Web service, referred to as an event source, for receiving messages about events, referred to as notifications. When the event source notifies the subscriber of an event, it is referred to as WS Eventing.

The compact message listener 304 receives messages from the mobile devices 102 via a compact message interface 305. The mobile data service acknowledgment listener 306 receives and acknowledges notifications from the mobile data service 116 via a mobile data service interface 307. Each of the three listeners 302, 304 and 306 receive administrative messages from the administration service 208 via a listener administrative interface 309.

In the present embodiment the listener interfaces 303, 305, 307, and 309 are configured using Hypertext Transfer Protocol/Hypertext Transfer Protocol over Secure Socket Layer (HTTP/HTTPS). However, these protocols have been selected as a design choice and other protocols may be used when desired. Accordingly, external systems transmit a HTTP/HTTPS request, which is received by the appropriate listener. The listener takes the message, makes minimal transformations, and forwards it to the messaging subsystem 224. The transformations include copying HTTP header information into message object fields. For example, the HTTP header information may identify the mobile data service 116 and wireless device 102 from which the message originated.

As previously described, the message listening application authenticates that the source of the message, be it the mobile data service 116, the wireless device 102 or event source 108, is valid.

Further, if reliable messaging is required, service availability is ensured and the listeners deal with solutions to availability attacks. In order to facilitate this, the messaging subsystem defines a threshold for a maximum number of messages and connections for a given time period from any backend server 108, component application or wireless device. The administrator can modify this threshold as desired, as well as allow for specific exceptions via the administration service 208.

Further, since message interception and replay attack is possible, the listeners detect and prohibit this attack using mechanisms that identify replayed messages. These mechanisms typically include the use of a nonce. A nonce is defined as parameter that varies with time. A nonce can be a timestamp or other special marker intended to limit or prevent the unauthorized replay or reproduction of a message. Because a nonce changes with time, it can be used to determine whether or not a message is original, or a replay or reproduction of the original message. The use of a nonce for preventing interception and replay attacks is known in the art and need not be described in detail, as standard implementations are utilized.

Further, other technologies, such as sequencing, can also be used to prevent replay of application messages in addition to, or in lieu of, the time timestamp technique. Once again, such techniques are known in the art and need not be described in detail, as standard implementations are utilized.

Figure 5:
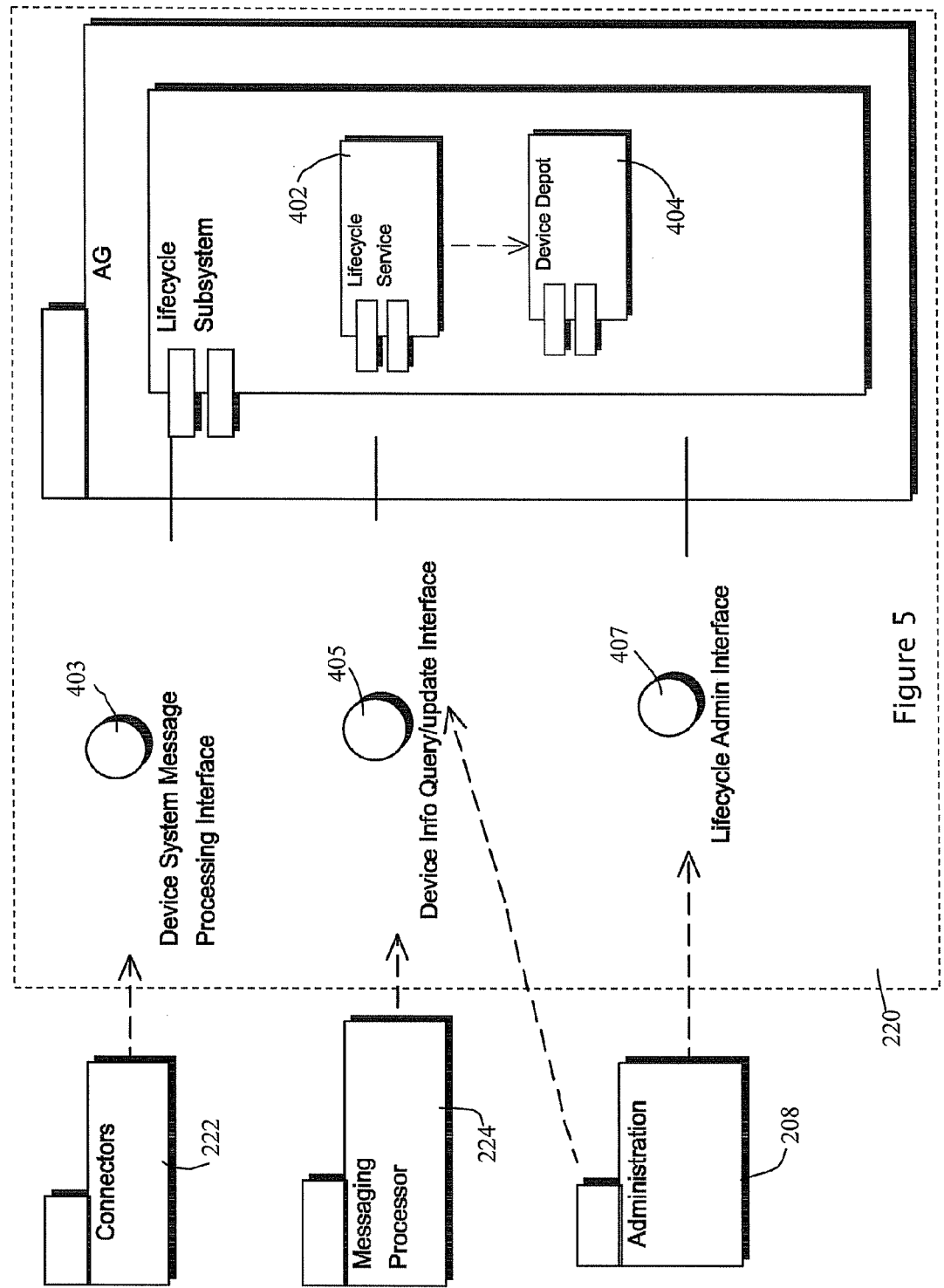
FIG. 5 shows in an interface diagram an example of the lifecycle subsystem in greater detail.

Referring to FIG. 5, an example of the lifecycle subsystem 220 is shown in greater detail. The lifecycle subsystem includes a lifecycle service 402 and a device depot 404.

The lifecycle service 402 processes device initiated messages that relate to the wireless device 104, the runtime environment lifecycle and the component application lifecycle. Such messages, for example, may relate to a wireless device registration or suspension, wireless device swap, wireless device availability, a component application installation, upgrade, or deletion, and runtime environment upgrades. These messages are communicated to and from the connector subsystem 222 via a device system message processing interface 403.

The lifecycle service 402 further provides the ability to query for wireless devices and component application using various filters. In order to facilitate this feature, the lifecycle service 402 communicates with the messaging subsystem 224 and the administration subsystem 208 via a device information query/update interface 405. In the present embodiment, the device information query/update interface 405 is implemented using a set of Java application program interfaces (APIs) for querying and updating device information. Typical interfaces include those for managing the wireless device's security and client administration policy.

The lifecycle subsystem 220 manages a security profile for each wireless device 104 registered with the application gateway 106 in the device depot 404. Each security profile includes a secure symmetric key for each device. This key is used for secure communication between the wireless device 104 and application gateway 106.

The client administration policy includes retrieving wireless device status, searching for component applications satisfying certain modifiable criteria, and searching for devices satisfying certain modifiable criteria. For example, it may be desirable to determine which component applications are installed on all the wireless devices or which wireless devices have specific component applications installed.

Yet further, a lifecycle administration interface 407 is provided for facilitating the management of the lifecycle subsystem 402 and the device depot 404 by the administration subsystem 208. For example, the administration subsystem can indicate the availability of a new version of a component application or the runtime environment.

Accordingly, the lifecycle service 402 manages the status of each of a plurality of assigned wireless devices 102, including the runtime environment and component applications stored therein. Information such as the runtime environment, component application status, and the wireless device security settings are stored in the device depot 404. The security settings may include, for example, client administration policy and the wireless device's encryption key.

The application gateway server 118 also allows for the use of third party lifecycle components, also referred to as lifecycle service providers, which are typically external to the application gateway 106. In order to facilitate lifecycle service providers, lifecycle service provider listeners are provided at the application services layer. The lifecycle service provider listeners are responsible for receiving notification on all lifecycle system messages from the lifecycle service providers and transmitting them to the administration subsystem 208 for processing. Further, the lifecycle service providers can access the administration service to configure the application gateway server 118 or send system messages.

Figure 6:
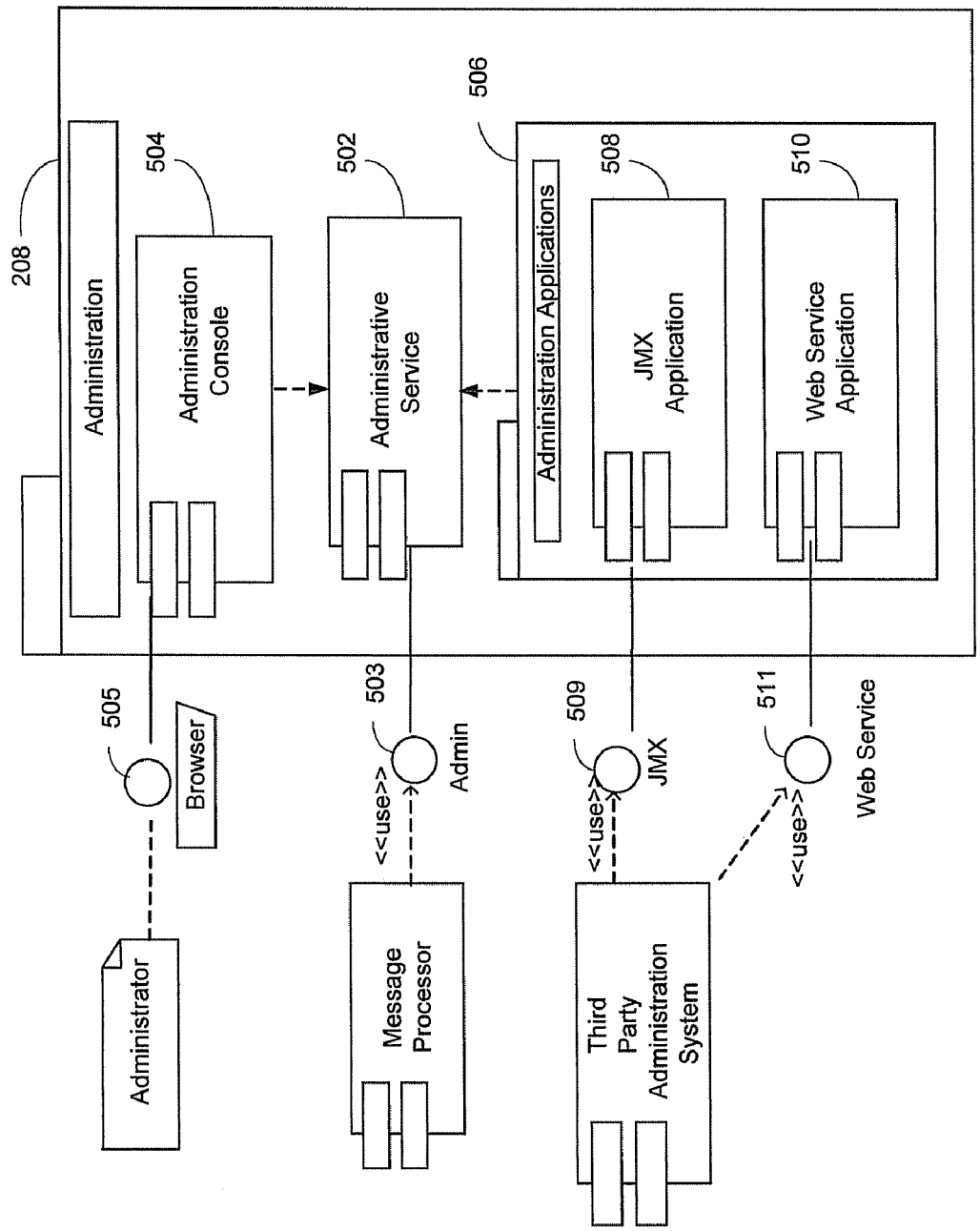
FIG. 6 shows in an interface diagram an example of the administration subsystem in more detail.

The administration subsystem 208 administers system messages, system devices, application gateway subsystems, system diagnostics, and default implementations of the provisioning and discovery services. Referring to FIG. 6, a more detailed view of an example of the administration subsystem 208 is shown. The administration subsystem 208 includes an administration service 502, an administration console 504 and administration applications 506. The administration applications 506 include a Java Management Extension (JMX) application 508 and a Web service application 510.

A browser interface 505 couples an administrator with the administrator console 502 for administrating the application gateway 106. An administrator interface 503 couples the administration service 502 with the messaging subsystem 224 for delivering administrative system messages. The administration applications 506 are coupled to their respective third party administrative applications via an appropriate interface. For example, the JMX application 508 is coupled via a JMX interface 509 and the Web service application 510 is coupled via a Web service interface 511.

The administration service 502 processes component application and runtime environment lifecycle events initiated by the administrator or the lifecycle service providers through the lifecycle administration interface. Examples of such events include installing a component application using push provisioning, refreshing the encryption key, upgrading the component application or runtime components, removing component applications, quarantining component applications and removing component applications from quarantine, applying component application cleanup script, querying the runtime environment for a status update, and updating the client administration policy.

The administration service 502 is also responsible for administration of the wireless devices 104. Accordingly, the administration service 502 is capable of responding to wireless device registration system messages and maintaining wireless device settings such as the security key, mobile data service URL, runtime version and status. The administration service 502 further supports the ability to list devices in accordance with predefined filter characteristics, such as query a device for its component application and runtime environment settings and query for component applications on specific devices.

The administration service 502 also provides the administrator with the ability to access application gateway subsystems runtime information and settings, per cluster node if applicable, and perform system-related tasks. Such tasks include viewing the message subsystem 224 runtime information, including message information per wireless device 12 and per component application, as well as the number of messages in queue, and a snapshot of the number of pooled objects of specific type. The administrator is able to modify specific settings at runtime as well as delete or reschedule expired messages.

Other information and settings provided by the administration service 502 include the following. The application gateway subsystem parameters are available for modification. Therefore, for example, the administrator can enable and disable various features at runtime. Database settings can be configured for a centralized application gateway database. This database may include all of the subsystem depots. The application gateway URLs can be configured to be accessible to external systems. For example, a URL may be assigned to the administration application 506 to allow access by third parties. Also a URL may be assigned to the packaging application to allow access by the provisioning service.

The administration service 502 may also store discovery service credentials, service provider credentials, mobile data service parameters and security parameters. The discovery service credentials can be used to authenticate the discovery service upon receiving a notification message that a component application is available. Similarly, service provider credentials, including its URL, can be used to authenticate a service provider upon receiving component application or runtime environment lifecycle messages. Mobile data service parameters can be used to connect the administrator to the mobile data service and include its IP address, user identification and password. The application gateway security parameters and settings, such as the application gateway public and private key and key refreshing policy, are used for encrypting communication between the application gateway and external applications.

The administration service 502 is also used for registering additional subsystems such as custom connectors and lifecycle listeners, for example.

The Web service application 510 uses Web services for directing service provider-initiated system messages to the administration service 502 for processing and delivery to device, if required.

Similarly, the JMX application 508 directs service provider initiated system messages to the administration service 502 for processing and delivery to device, if required. However, the JMX interface 509 is an open interface that any management system vendor can leverage. The administration infrastructure is based on JMX technology, which is an open technology for system management and monitoring. Each management system implements a set of Mbeans objects in order to be configurable. These objects must be registered with an MbeanServer running in the process space of the object, in accordance with JMX specification.

Since the application gateway 106 can potentially run in a distributed environment, that is some subsystems may run on different application servers, then each application server needs to have its own implementation of the MbeanServer. Further, each subsystem needs to be configured using a separate Administration Console provided by the corresponding application server, or using third party console that knows how to access the functionality provided by MbeanServer.

A runtime environment framework container is a client-resident container within which applications are executed on a device. The container manages the application lifecycle on the device (provisioning, execution, deletion, etc.) and is responsible for translating the metadata (XML) representing an application into an efficient executable form on a device. The container provides a set of services to the application, as well as providing support for optional JavaScript. These services include support for UI control, data persistence and asynchronous client-server messaging, etc.

Figure 7:
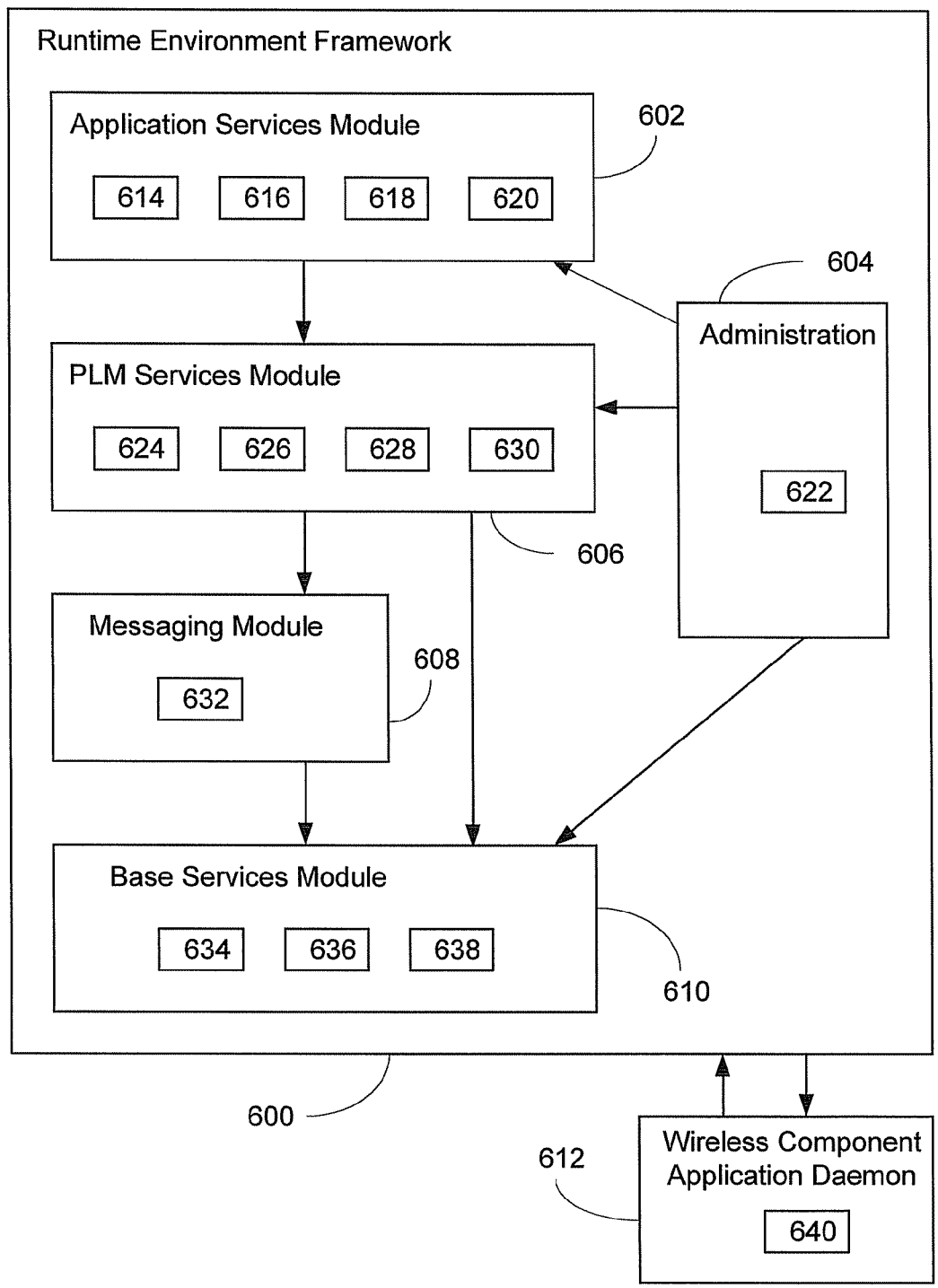
FIG. 7 shows in a component diagram an example of a runtime environment structure of the wireless component application.

FIG. 7 shows an example of a runtime environment framework 600. The runtime environment framework 600 comprises an application services module 602, an administration module 604, a provisioning and lifecycle management (PLM) services module 606, a messaging module 608, and a base services module 610. Components may be removed or added to the runtime environment framework 600. The runtime environment framework 600 communicates with a wireless component application daemon 612.

The application services module 602 includes a screen service 614 for providing an interface between currently running applications and a user, an interpreter service 616 for providing an execution environment for the applications, a metadata service 618 for handling and mediating application metadata related access, and an access service 620 for allowing applications to access other applications on the device 102.

The administration module 604 includes a control center 622 for handling a user interface of the wireless component application runtime environment framework 600, processing user interaction with the wireless component application runtime environment framework 600, and for integrating the wireless component application runtime environment framework 600 with the network system 100.

The PLM services module 606 includes a RE container 624 for coordinating RE container upgrades and backup/restore processes and for implementing a default error handling mechanism for the RE framework 600, a discovery service module 626 for locating applications in an application repository, a provisioning service 628 for application provisioning (including application downloads, installation and upgrades), and a lifecycle service 630 for registering, maintaining information for, and administrating applications.

The messaging module 608 includes a messaging service module 632 for message queuing, message (de)compacting, and message distribution.

The base services module 610 includes a persistence service 634 for storing a RE profile (including its version, directory, client administration policy, application administration policies, security keys, available upgrades, etc.), storing an application profile (including its version, metadata, application persistence data components, application persistable global data and application resource, available upgrades, etc.), and storing reliable messages (including outgoing messages pending delivery due to out of coverage, and incoming reliable messages pending processing). The base services module 610 also includes a security service 636 for restricting access to RE services, providing message authentication, integrity, and encryption. The base services module 610 also includes a communication service 638 for sending and receiving messages in and out of the device 102, downloading resources and files from appropriate repositories, and notifying interested RE services about wireless coverage events.

The wireless component application daemon module 612 includes a daemon 640 for restarting the wireless component application process whenever it stops due to a fatal exception.

Figure 8:
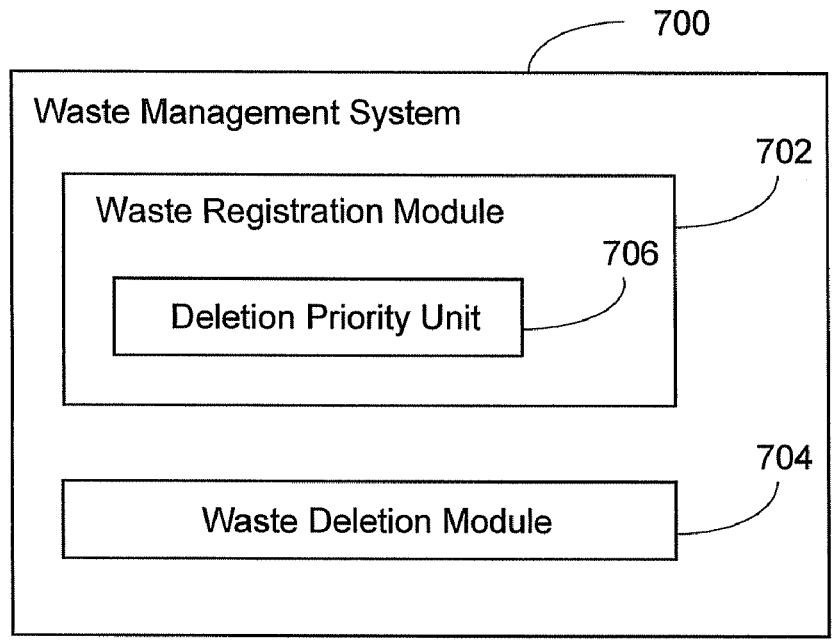
FIG. 8 shows in a component diagram an example of a waste management system for registering and deleting application waste, in accordance with an embodiment of the present patent disclosure.

FIG. 8 shows an example of a waste management system 700 for registering and deleting application waste, in accordance with an embodiment of the present patent disclosure. The waste management system 700 comprises a waste registration module 702 for registering waste, and waste deletion module 704 for deleting registered waste. The waste registration module 702 includes a deletion priority unit 706 for assigning deletion priority to registered waste based on the deletion preferences that are provided by applications (call-back function). An application is able to register its waste, or application data or data records that could be deleted, to the waste management system.

Waste applies to storage space, runtime memory, or both. The waste is generally useless or temporarily useless and can be deleted safely without affecting the current executions of applications. For example, an application has loaded much data into the runtime memory and likely only 10% is needed for the current execution. In this case, this application can use the call-back function to let the waste management module 702 register this data as waste with relative higher priority. Another example relates to storage: the electronic mail client on a mobile device would store a certain amount of electronic mail locally. However, when a low-memory event occurs, old electronic mail that has been registered with higher priorities is deleted prior to those with lower priorities. Each data record registered as waste is associated with a deletion priority. The waste deletion module 704 then removes registered waste based on the priority that is associated with the waste.

Other components can be added to the waste management system 700, including a cleanup function that is called by the waste management system 700, and a memory notification unit for calling the waste deletion module 704. The waste management system 700 may be implemented to reside in an application process, or to run as a stand-alone application which takes care of all applications. In a wireless device, the waste management system 700 is preferably implemented in a persistence service 634, and communicates with a lifecycle service 630.

Figure 9:
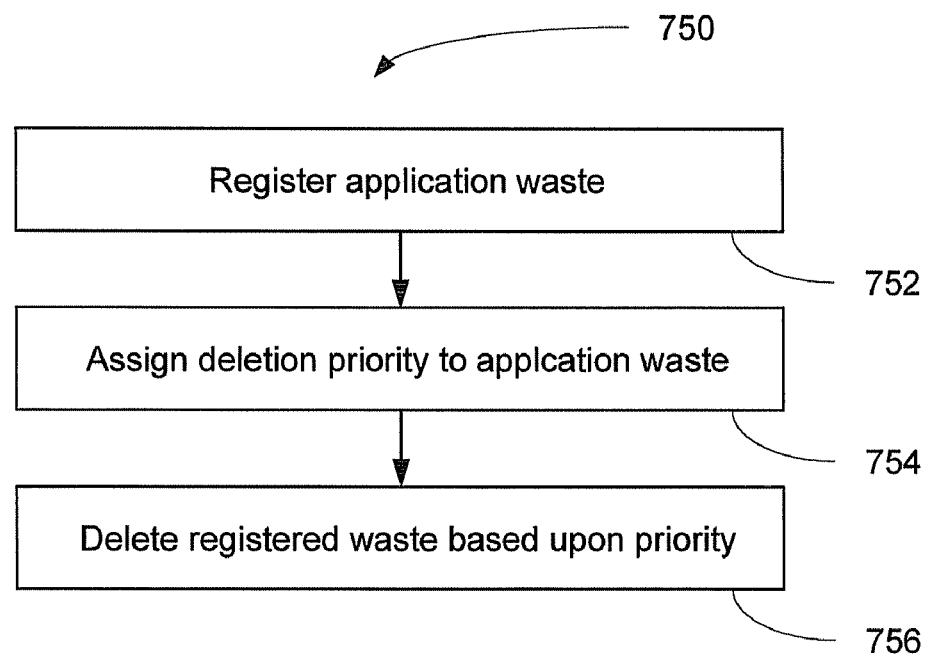
FIG. 9 shows in a flowchart an example of a method of waste management, in accordance with an embodiment of the waste management system.

FIG. 9 shows in a flowchart an example of a method of waste management (750), in accordance with an embodiment of the waste management system 700. The method (750) begins with registering application waste (752). Next, a deletion priority is assigned to the registered waste (754). Finally, the registered waste is deleted (756). Other steps may be added to the method (700), including receiving notification that an application requires its waste to be registered, receiving notification that device memory is low, and ending the waste deletion when a low-memory situation is resolved.

Figure 10:
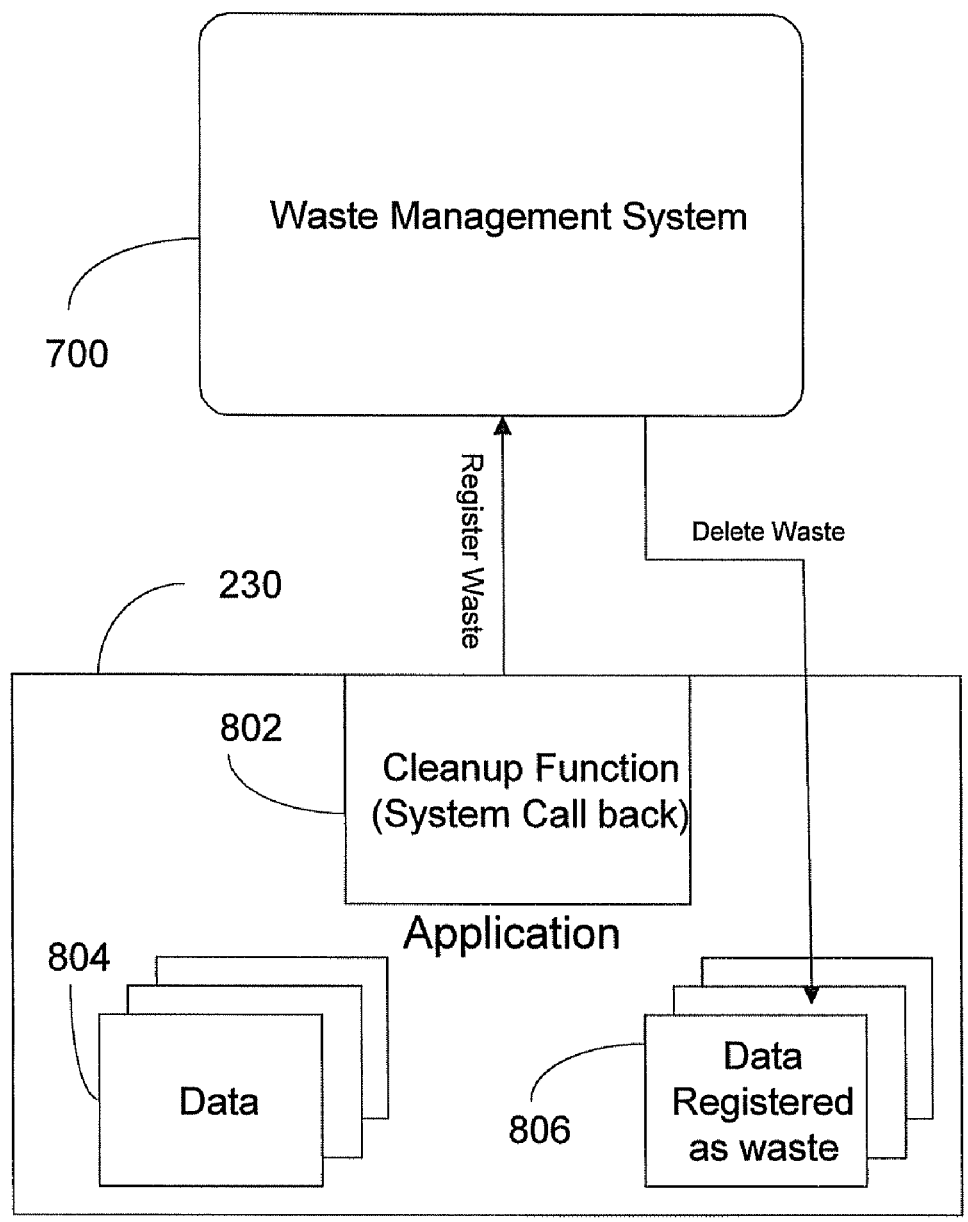
FIG. 10 shows an example of a logic system structure of the waste management system.

FIG. 10 shows an example of a logic system structure 800 of the waste management system 700. The logic system structure 800 comprises a cleanup function (call-back function) 802 called by the waste registration module 702, and the waste management system 700 for application waste registration and deletion management. Preferably, the cleanup function 802 is a system call-back function that is implemented in an application 230 by an application developer. The application would also store data 804 and data registered as waste 806. The cleanup function 802 provides a method for the developer to register application waste that is associated with corresponding deletion priorities, which is determined by a specific application's business logic. The information about what is waste and what priority is associated with the waste is provided by the cleanup function, which is written by developers. How a data record is flagged as waste with certain deletion priority, is a matter of implementation.

Preferably, the waste deletion module 704 is activated when the storage memory is low. Other forms of memory can also be monitored. Preferably, a memory notification module notifies the device that its storage memory is low. Such a notification module may be implemented in the lifecycle service 630. The registered waste would be deleted in the order determined by associated deletion priorities. Preferably, the deletion procedure stops once the low-memory situation is resolved.

The waste registration module 702 may be invoked, or the cleanup function 802 may be called under different situations. For example, when an application is about to end, its cleanup function may be called by the waste management to register the application's waste which is associated with proper deletion priority. Another example is when an application switches to a background running status, its cleanup function may be called to assign a deletion priority to its waste, or data records that could be deleted when the storage memory is low. Other examples include when an application is running and the device is cradled, or when an application is running and a low-memory event occurs.

Figure 11:
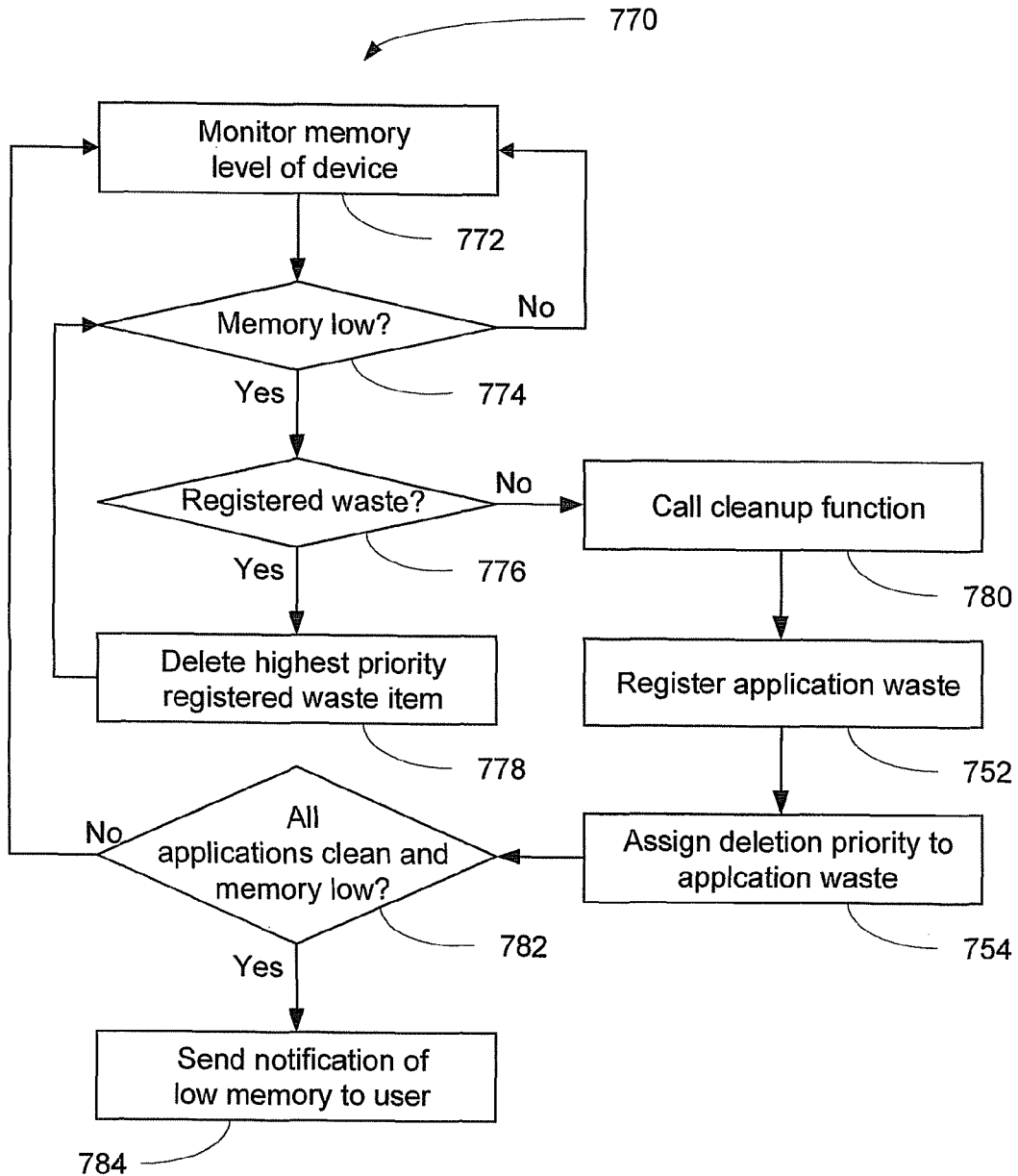
FIG. 11 shows in a flowchart, another example of a method of waste management, in accordance with an embodiment of the waste management system.

The waste deletion module 704 may be invoked when memory is low. Preferably, two levels of deletion, or two stages are involved. The first is a low-memory event that triggers the waste deletion module 704. A level 1 means that the low-memory situation is cleared by deleting some of all waste that has been flagged. A level 2 means that although all the waste that has been flagged was deleted, the low-memory situation is still present and the cleanup functions of running applications should be called to flag more waste and then delete the waste in order to clear the issue. If this fails, then a notification (preferably visual) is given to the user. FIG. 11 shows in a flowchart, another example of a method of waste management (770), in accordance with an embodiment of the waste management system 700. The method (770) begins with monitoring the memory level of a device (772). If memory is low (774), and there are registered waste items (776), then the registered waste item with highest deletion priority is deleted (778). Otherwise (774), the method continues to monitor the memory level of the device (772). Once the highest deletion priority item is deleted (778), the method checks if memory is sill low (774).

If the memory is low (774), and there are no registered waste items (776), then the cleanup function 802 is called for an application that is running (780). Preferably, the cleanup function 802 is called for all applications that are running. The cleanup function 802 registers application waste (752) and assigns priority (754) to the waste. If the cleanup function has been called for all applications and memory is still low (782), then a notification is sent to the user of the device (784)

The notification can be visual, audible, device vibration, any combination thereof, or any other type of notification. Otherwise (782), the method (770) returns to monitoring the memory level to see if it is low (772).

Note that data is deleted on the basis of priority. If the low-memory situation is resolved prior to the deletion of lower deletion priority waste, the waste deletion module 704 stops. If the memory is still low after the waste deletion module 704 completes its task after a level 1 low-memory event, a level 2 low-memory event invokes waste management system 700. The following is an example of an implementation of the waste management system 700 after a low-memory event:

```
// Receive a low memory event, which triggers the waste deletion
procedure.
// Level 1:
    if (low_memory) {
        for (i=0; i<N; i++) {
            delete all marked data records with priority i;
            if (!low_memory) {
                stop;
            }
        }
    }
// now all marked data records have been deleted.
//Level 2:
    if (still_low_memory) {
        // still low memory, e.g., the second low memory event occurs
        // immediately after the Level 1 deletion
        Execute the cleanup scripts of applications that are running;
        // then delete all marked data.
        for (i=0; i<N; i++) {
            Delete all marked data records with priority i;
            if (!low_memory) {
                stop;
            }
        }
        if (still_low_memory) {
            visual_notification("memory is low.");
        }
    }
```

The waste management system and methods according to the present patent disclosure may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present patent disclosure, as well as the hardware, software and the combination thereof.

While particular embodiments of the present patent disclosure have been shown and described, changes and modifications may be made to such embodiments without departing from the true scope of the patent disclosure.

What is claimed is:

1. A method of memory management on a wireless device, the method comprising:

determining a first low-memory event when available memory is below a defined threshold;

deleting a first set data records stored in the memory when the first low-memory event is determined, the first set of data records incrementally deleted in order of a priority associated with each data record until the first low-memory condition is cleared or no more of the first set of data records are present;

determining a second low-memory event when available memory is still below a defined threshold after deletion of the first set of data records;

executing a cleanup script on the wireless device, the cleanup scripts marking a second set of data records for deletion and assigning a priority when the second low-memory event occurs; and deleting the second set data records stored in memory when the second low-memory event is determined, the second set of data records incrementally deleted based in order of priority associated with each data record until the second low-memory condition is cleared or no more of the second set of data records are present.

2. The method of claim 1 wherein one cleanup script is associated with one application currently executing on the wireless device.

3. The method of claim 2 wherein cleanup scripts for each application currently executing on the wireless device is executed when the second low-memory event occurs.

4. The method of claim 1 wherein one cleanup script is associated with a plurality of applications currently executing on the wireless device.

5. The method of claim 1 further comprising providing a visual notification to a user when the second low memory event continues to exists after deleting all possible waste.

6. The method of claim 1 further comprising executing the cleanup script on the wireless device, the cleanup script marking the first set of data records for deletion and assigning the priority when an application executing on the wireless device is about to end.

7. The method of claim 1 further comprising executing the cleanup script on the wireless device, the cleanup script marking the first set of data records for deletion and assigning the priority when an application executing on the wireless device switches to a background running status.

8. The method of claim 1 further comprising executing the cleanup script on the wireless device, the cleanup script marking the first set of data records for deletion and assigning the priority when the wireless device is cradled.

9. The method of claim 1 further comprising executing the cleanup script on the wireless device, the cleanup script marking the first set of data records for deletion and assigning the priority when the wireless device is in a sleep mode.

10. A wireless device comprising:
a memory comprising a plurality of data records, each of the data records associated with one or more applications executed on the device;
a processor coupled to the memory, the processor performing:
determining a first low-memory event when available memory is below a defined threshold;
deleting a first set data records stored in the memory when the first low-memory event is determined, the first set of data records incrementally deleted in order of a priority associated with each data record until the first low-memory condition is cleared or no more of the first set of data records are present;
determining a second low-memory event when available memory is still below a defined threshold after deletion of the first set of data records;
executing a cleanup script on the wireless device, the cleanup scripts marking a second set of data records for deletion and assigning a priority when the second low-memory event occurs; and
deleting the second set data records stored in memory when the second low-memory event is determined, the second set of data records incrementally deleted based in order of priority associated with each data record until the second level low-memory condition is cleared or no more of the second set of data records are present.

11. The wireless device of claim 10 wherein one cleanup script is associated with one application currently executing on the wireless device.

12. The wireless device of claim 10 wherein cleanup scripts for each application currently executing on the wireless device is executed when the second low-memory event occurs.

13. The wireless device of claim 10 wherein one cleanup script is associated with a plurality of applications currently executing on the wireless device.

14. The wireless device of claim 10 further comprising providing a visual notification to a user when the second low memory event continues to exists after deleting all possible waste.

15. The wireless device of claim 10 further comprising executing the cleanup script on the wireless device, the cleanup script marking the first set of data records for deletion and assigning the priority when an application executing on the wireless device is about to end.

16. The wireless device of claim 10 further comprising executing the cleanup script on the wireless device, the cleanup script marking the first set of data records for deletion and assigning the priority when an application executing on the wireless device switches to a background running status.

17. The wireless device of claim 10 further comprising executing the cleanup script on the wireless device, the cleanup script marking the first set of data records for deletion and assigning the priority when the wireless device is cradled.

18. The wireless device of claim 10 further comprising executing the cleanup script on the wireless device, the cleanup script marking the first set of data records for deletion and assigning the priority when the wireless device is in a sleep mode.

* * * * *